Dec. 29, 1970 A. R. REMKE ET AL 3,550,318

CONTOUR FORMED BAG AND METHODS OF MAKING AND USING SAME

Filed July 11, 1968 3 Sheets-Sheet 1

INVENTORS
Adam Robert Remke
Anna Remke

BY Hill, Sherman, Meroni, Gross & Simpson
ATTORNEYS

INVENTORS
Adam Robert Remke
Anna Remke

BY Hill, Sherman, Meroni, Gross & Simpson
ATTORNEYS

CONTOUR FORMED BAG AND METHODS OF MAKING AND USING SAME

INVENTOR.
Adam Robert Remke
Anna Remke
BY Hill, Sherman, Meroni, Gross & Simpson
ATTORNEYS United States Patent Office 3,550,318

Patented Dec. 29, 1970

1

3,550,318
CONTOUR FORMED BAG AND METHODS OF MAKING AND USING SAME

Adam Robert Remke and Anna Remke, Chicago, Ill., assignors to Remke Company, Chicago, Ill., a corporation of Illinois

Filed July 11, 1968, Ser. No. 744,157
Int. Cl. A01g *23/04;* B65d *29/00*
U.S. Cl. 47—37 4 Claims

ABSTRACT OF THE DISCLOSURE

A contour bag for the "ball" of a removed tree or plant is specially made to fit the form of a predetermined configuration of the "ball." In one example the predetermined configuration of the "ball" results from cutting the ball out of the surrounding soil initially in the configuration of an inverted four-sided pyramid and then removing the pyramid tip portion to form an inverted frustum of a pyramid having a flat area which will allow the plant or tree to stand upright while being stored out of the ground. The contour bag conveniently fits about this form, preserves the flat bottom configuration and thereby facilitates handling, storage and display of the tree or plant. Formation of the bag is effected by cutting a number of separate pieces of material, securely joining their edges together and providing a drawstring around an upper portion.

BACKGROUND OF THE INVENTION

(1) Field of the invention

This invention generally relates to an article and methods used in transplanting plants or trees. More particularly it includes a method of providing a uniformly configured "ball" on a plant or tree that is removed from the soil. Another aspect of the invention is the construction and method of making a contoured bag that will conform to the shape of the uniformly configured "ball" and allow great convenience in its application and use.

(2) Description of the prior art

Heretofore the removal of plants and trees from the soil has been accomplished by hand tools or crude mechanical apparatus. This has resulted in the balls of the plants or trees being of an irregular size and configuration which varied with each plant or tree. For the individual gardner this has been adequate, however for the florist or nursery operator this prior art method has been very inconvenient. Thus, for example, the irregular and inconsistently shaped ball has the disadvantage that when the removed plant or tree is to be stored each will stand at a different angle. There is little chance that these plants or trees will be vertically disposed and each will be canted this way and that. A greater amount of space is needed because of the irregular balls and because of the various angles thus storage is a problem. Moreover, potential buyers or selectors of the plants and trees find it difficult to choose between trees lying helter-skelter. Also it has been experienced that bags of the present single piece sheet-like construction are held on the plant or tree by a separate rope drawn around the gathered edges and ends of the material. Not only is this inconvenient in that the edges and ends will pull out from under the ropes, but also there is a tendency in the handling of the plants and trees to put stresses and strains on these bags that cause them to quickly open. Furthermore, the irregularly shaped balls make it uncertain as to the size and shape of the material that will be necessary to properly cover and protect these "balls." If too much material is provided it is wasteful, whereas if not enough

2 material is provided the protection to the ball is inadequate.

SUMMARY OF THE INVENTION

The bag construction of the present invention and its use in a method of removing a tree or plant with a predetermined "ball" configuration and preparing the "ball" for handling, storage and display, overcomes the problems associated with the prior art.

Thus, providing a "ball" having a flat portion on the bottom and encasing the thus formed "ball" in a bag specifically contoured to the configuration of the "ball" preserves the flat bottomed configuration and greatly facilitates handling, storage and display. It is to be understood in the context of this application that the term "ball" refers to the soil and roots of a plant, tree or similar growing thing which is ordinarily dug up when the thing is to be removed from the surrounding soil.

The method of removing and handling the live tree includes digging a ball surrounding the base and roots of the tree that has the form of an inverted pyramid. The ball is then lifted away from the surrounding soil and the tip of the pyramid is severed to leave an inverted frustum of a pyramid attached to the tree. The portion severed is, of course, measured from the tip so that each ball is of the same predetermined configuration. This ball is then inserted by suitable means into a contoured bag of a construction hereinafter to be explained, having a drawstring about its upper edge. Pulling the drawstring taut brings the form fit bag into close conformity with the predetermined configuration of the ball so the shape of the ball is preserved. Although the seams of the contoured bag serve as a shape retaining means it is within the scope of this invention to lace the ball thus formed with additional twine or similar means to secure the bag for storage and rehandling. Storing the bag on the flat area created by severing the tip of the pyramid results in a substantially vertically upstanding tree. This uniformity of attitude allows the thus protected trees to be compactly and neatly stored and displayed. Also the potential damage which might result from the trees laying on top or against one another in a helter-skelter storage as is present in the prior art has been effectively eliminated. Inasmuch as the plants and trees have considerable value and in most cases have been chosen because of their unusual or unique beauty, the prevention of this damage is an important advantage of the present invention.

The bag which allows the above noted advantages comprises an initially open top bag having a predetermined configuration such as that of an inverted four-sided pyramid. For the inverted pyramid embodiment the bag may be constructed of two or four pieces of material secured together. When four pieces are used, each piece comprises a central portion in the shape of a regular trapezoid having a long base, a short base and a pair of opposite sides interconnecting the ends of the bases. A rectangular flap associated with each base has one side in common with a base and extends therefrom. Preferably the sides of the flap and the base are coextensive. To form the flat bottom, each of the rectangular flaps associated with the short base has a V-shaped notch centrally located therein on the side of the flap opposite the common side. The flap is configured so that when it is folded and joined together with the flaps of the other pieces to form the bottom of the bag there will be sufficient material to form a secure seam.

After the four pieces, shaped as noted above, have been cut out, two of the pieces are placed on top of one another and one of the edges of these two pieces are joined together. To assure that these edges are securely formed a seam formed by sewing what is termed a "double seam" may be used. With the two pieces thus joined along one edge, another pair of pieces similarly joined are brought together and the unjoined edges of the two pairs of pieces are joined to form a bag in the shape of a frustum of a pyramid. In the cutting of the pieces it is preferred to cut the material in the direction of either of woof or warp so that "give" or stretch of the material is minimized. We have found that cutting the material on a bias, that is, on a line approximately bisecting the angle between the woof and warp, causes the material to stretch. Moreover, in a loosely woven material such as burlap, for example, there is a great tendency for the edges of the material to ravel. These problems are overcome in the present invention by cutting the material forming the bottom along the woof and warp.

DESCRIPTION OF THE PREFERRED EMBODIMENT

Figures 1, 2, 3, 4:
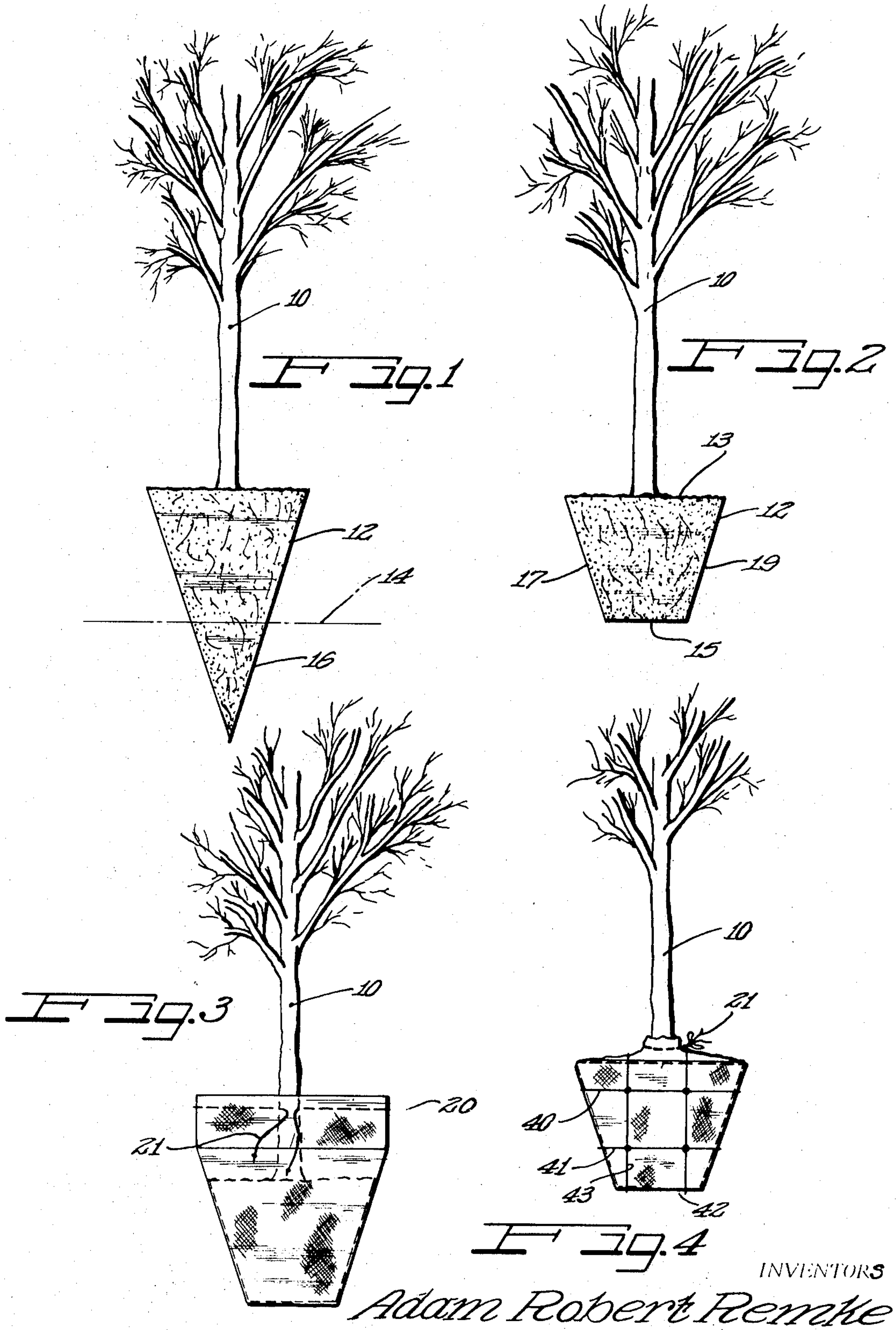
FIG. 1 is an elevational view of a tree removed from the earth having a predetermined ball configuration.
FIG. 2 is an elevational view illustrating the pyramid type ball of FIG. 1 with the tip cut off at a predetermined distance.
FIG. 3 is an elevational view of the ball as it is being encased in a bag of the present invention.
FIG. 4 is an elevational view of the bag of the present invention drawn tight about the ball and laced thereto.

A tree 10 is shown in FIG. 1 removed from the earth with an attached ball of roots and soil 12, 16. As initially removed from the earth the ball is here shown taking the configuration of an inverted four-sided pyramid. The configuration and size of this ball will be the same for a wide range of tree sizes. In this regard, it may be observed that a large percentage of trees which are transplanted range from 6" in diameter trunks down to saplings, although the average and optimum size is probably 2 to 4" diameter trees. Thus three or four standard "ball" sizes will accommodate almost all trees to be transplanted. Likewise only three or four standard size bags are necessary.

A line 14 generally parallels the base of the pyramid and is a predetermined distance between the tip and the base. The line 14 designates the point at which the pyramid is severed to remove the portion 16. The remaining portion 12 thus takes the general shape of an inverted frustum of a four-sided pyramid.

As seen in the elevational view of FIG. 2 each side of the pyramid takes the form of a regular trapezoid having a long base 13, a short base 15 and sides 17, 19 connecting the opposite ends of each of the bases. In practice we have found that for a medium size tree of say 4" the long base 13 may be 42", the short base 15 may be 15", and the sides 17 and 19 may be 30". In this case the tip 16 would be cut off about 16" from the tip or point. This laves a flat area 15" square upon which the tree may be stood.

To preserve this advantageous configuration of the ball we provide a contoured bag generally indicated at 20 in FIG. 3. The ball 12 is inserted into the bag 20 very conveniently since both will always have the same dimensions. This step of inserting is preferably done right after the tip 16 has been removed. Once the ball is in the bag a drawstring 21 surrounding the upper edge of the bag is drawn taut around the trunk of the tree 10 and secured to give the bag a snug fit thereby retaining the ball in its predetermined configuration. We have found polypropylene twine to be a satisfactory material for the drawstring. Application of the bag to the ball is easily effected by two men holding the bag below the digging apparatus until the ball is firmly set on the ground and the digging machine is removed. With the machine removed the drawstring is simply drawn tight and the bagging has been completed.

If desired and if conditions so require, the thus encased ball may be laced with a series of members 40, 41, 42 and 43 as shown in FIG. 4 to better secure the bag for storage and rehandling. We have thus illustrated in FIGS. 1–4, a method of conveniently removing and handling a live tree that includes digging or removing a tree having a ball of soil and roots in the form of an inverted pyramid, lifting the ball out of the hole a distance and chopping off a predetermined portion of the ball to leave a flat bottom, inserting the ball in a contoured bag having a drawstring about its upper edge, drawing the drawstring taut about the trunk thereby preserving the shape of the ball, lacing the thus encased bag and storing the thus formed ball on its flat bottom portion. We have found that trees prepared by the above method are readily and compactly stored in a uniform upright vertically disposed position which not only facilitates storage, aids in the selection and comparison of the trees, but enhances their attractiveness to a prospective buyer. Thus, the shopper sees tre tree disposed in its normal position rather than helter-skelter, allowing him to visualize the tree in its ultimate location and quickly and accurately make comparisons between various trees.

The construction and method of making two embodiments of the bag used in the above described method are set out in FIGS. 5 through 12. Construction of the bag that will encase the ball having the configuration of a frustum of a four-sided pyramid as is shown in FIGS. 1–4 for example is accomplished by cutting out the necessary pieces from a suitable piece of material in a manner to be described and joining them together as will hereinafter be described to readily form a strong shape-retaining bag.

Figures 5, 6, 7, 8:
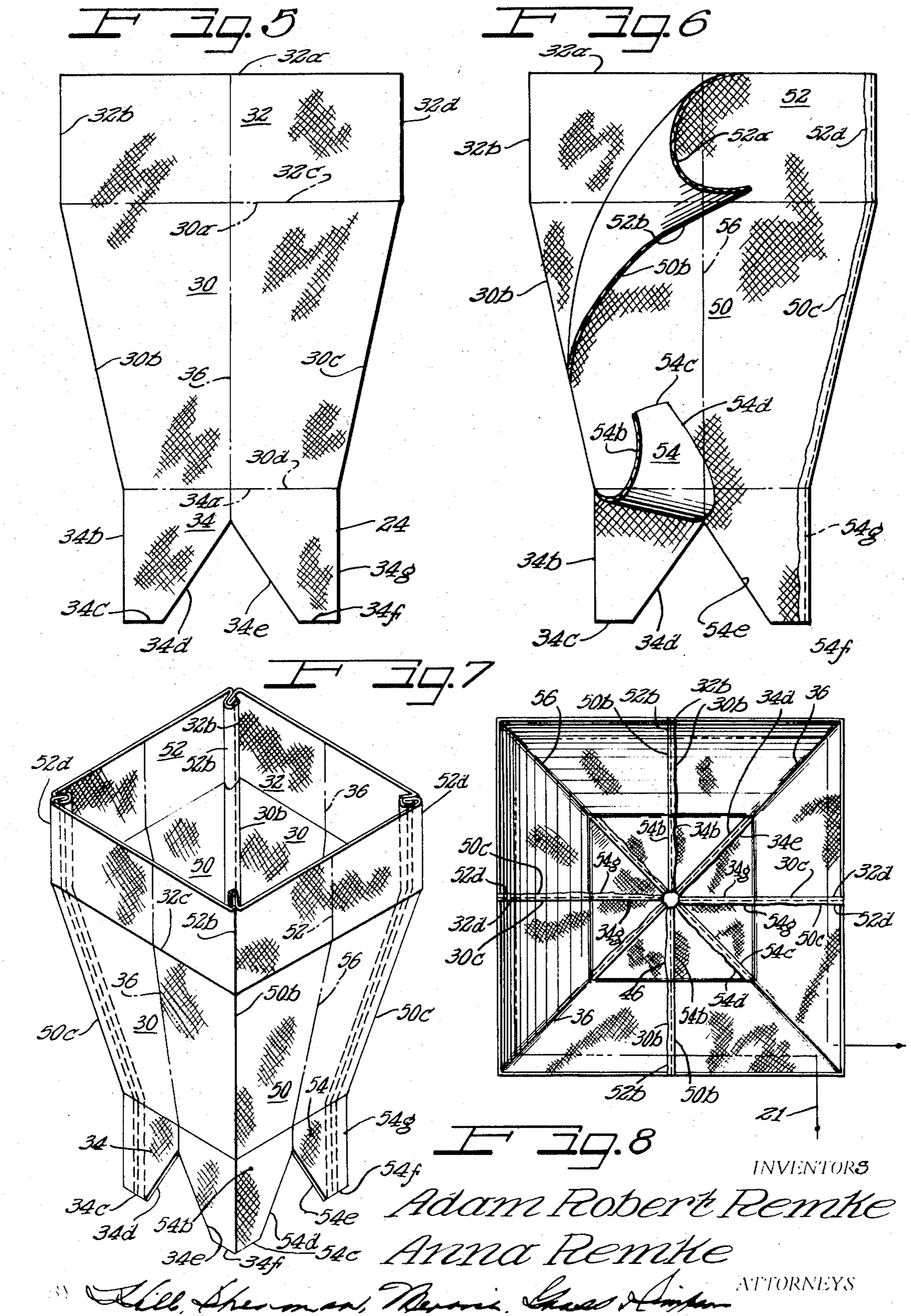
FIG. 5 is a full view showing the configuration of a piece of material which forms one-fourth of a bag of a first embodiment of the invention.
FIG. 6 is a full view illustrating two of the pieces shown in FIG. 5 superimposed on one another and joined along one edge.
FIG. 7 is a perspective view of two of the pieces as were shown in FIG. 6 joined together at their free edges to form the bag having a predominant configuration of an inverted pyramid.
FIG. 8 is a view looking into the open end of a completed and fully opened bag of the first embodiment of the present invention.

Referring initially to the first embodiment as set out in FIGS. 5–8, there is illustrated in FIG. 5 a piece of material cut to form one side of the four-sided bag. Each piece has a central or main portion 30 in the configuration of a regular trapezoid. A long base **30*a* and a short base 30*d* are connected by sides 30*b* and 30*c*. A flap 32, which may be in the form of a rectangle, has a side 32*c* coextensive with the side 30*a* of the central portion. The remaining sides of flap 32 are designated as 32*a*, 32*b*, and 32*d*. A similar flap 34 has a side 34*a* coextensive with the short base 30*d* of the central portion 30. The flaps 34 of the four pieces which go to make up the bag have a notch cut out along the lines 34*d* and 34*e* to facilitate the formation of the bag bottom. Sides 34*b* and 34*g* extend from opposite ends of line 34*a* and have at their respective ends the side portions 34*c* and 34*f* interconnecting them with the sides 34*d* and 34*e***.

As the next step in the formation of the bag a second piece of material having a main portion 50, an upper flap 52 and a lower flap 54 is superimposed upon the piece illustrated in FIG. 5. The second piece is identically formed and for purposes of illustration may be seen in FIG. 6 to have designations for the various sides and parts corresponding to those on the piece of FIG. 5. In FIG. 6 a portion of the flaps 52 and 54 are shown turned back to illustrate the relationship between the parts. With the pieces in this superimposed relationship a double seam joint is effected along one side by running a stitch or other equivalent joining means along and through the edges 32*d*, 52*d*; 30*c*, 50*c*; and 34*g*, 54*g*. With this done the material may be folded back upon itself so that for example the edge 50*b* is now on the opposite side of 30*b*. With the pieces thus positioned a second stitch may be run down the sides mentioned above if desired. This double or "French" seam is a very strong and reliable seam. Where an especially strong bag is required, the seams and joinings of this bag may be formed in this manner although it is recognized that other equal and equivalent means may be used. An advantage of the double seam is that it can readily transmit pulling stresses from the upper drawstring flap to the bottom and thereby assure that the drawstring will pull the bag into conformity with the predetermined configuration of the ball.

After the double piece unit has been formed with its respective common joined edge these two double pieces are again joined along their free edges as is shown in FIG. 7. Thus, there may be seen the central portion 30 and flaps 32, 34 of a first piece joined to a central portion 50 and flaps 52, 54 respectively of a second piece. In practice the darts in the bottom have not yet been formed and the joining of the free edges of the flaps 34 and 54 of a pair of first and second pieces as is illustrated in FIG. 6 will result in a structure as is shown in FIG. 7. A dart is formed in the flaps 34 and 54 subsequent to their being joined together as shown in FIG. 7. These darts may be formed in the flaps 34 and 54 by joining the sides 34*d*, 34*e* and 54*d*, 54*e* together so that they become coextensive. The formation of this dart creates fold lines 36, 56 which will form the four corners of the completed bag. The bag as shown in FIG. 7 may easily be turned inside out to accomplish the edge joining. After all the darts have been formed in the bottom a seam or joint along the edges 34*c*, 34*f* and 54*c*, 54*f* and through the common intersection of all of the darts is made to complete the tight and rugged bag.

FIG. 8 shows a view looking into a completed bag. Here the edges forming the seams and the darts are clearly seen. The designations in FIG. 8 correspond to those used in FIGS. 5, 6 and 7, and therefore, it is not considered necessary to repeat them. Again it should be pointed out, however, that the lines 36 and 56 extend from the end of the dart to the upper edge of the bag designate the fold areas in the corner of the bag. It is also pointed out that the direction of the woof and warp of the material are not indicated for the bottom area of the bag because the Symbols for Draftsmen, Rule 84(*g*), of the Patent Office Rules of Practice (1965), will not permit it. The material of flaps 34 and 54 that forms the bottom is cut so that the woof and warp are perpendicular or parallel to the sides of the square or rectangular bottom. This particular orientation of the weave of the material has been found effective in minimizing the stretch on the bag in the critical area of the bottom.

The upper flaps 32 and 52 have the drawstring 21 threaded therethrough in a suitable manner. In FIG. 8 it may be seen that the drawstring has no special formed run-way or slot through which it extends but rather it is threaded loosely through the material to alternate between opposite sides of the material. This has been found to be effective in practice. However, it is recognized that a more elaborate accommodation of the drawstring may be formed by folding over of the flaps 32 and 52 so that for example side 32*a* is attached in the vicinity of side 32*c*. The particular design will vary with the design requirements of the bag.

A second embodiment of a bag suitable of carrying out the invention of FIGS. 1–4 is shown in FIGS. 9–12. This second embodiment differs from the first in that the material is cut so that only two pieces are required to be cut and joined to form a complete bag.

Figure 9:
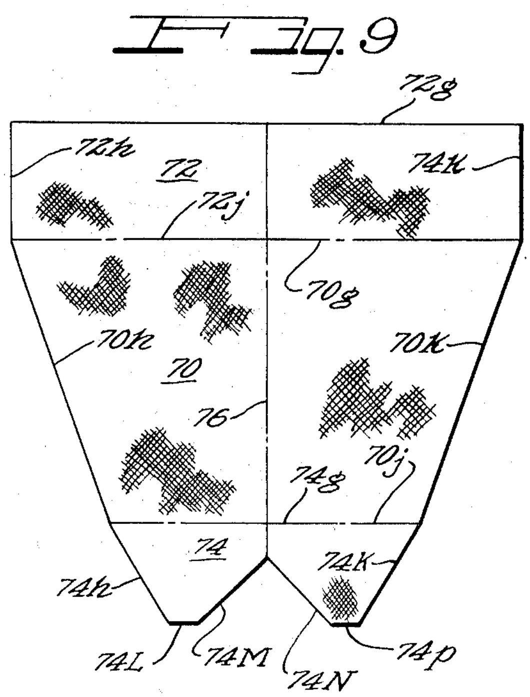
FIG. 9 is a full side view showing the configuration of a piece of material which forms one-half of a bag of a second embodiment of the invention.

One of these pieces is shown in FIG. 9 in plan view. As with the four piece bag, the material is cut to have a central portion 70 in the predominant configuration of a regular trapezoid. A long base 70*g* has a flap portion 72 coextensive therewith along the flap side 72*j*. The remaining sides of the rectangular flaps are 72*g*, 72*h* and 72*k*.

A short base 70*j* is coextensive with side 74*g* of a lower flap 74. It is the purpose of the lower flap 74 to form the bottom of a completed bag. Where, as here, it is desired to have a square-bottom bag this may be accomplished by making darts with cut portion bodered by the edges 74M, 74N. In this embodiment it will be seen that the edges 74*h* and 74*k* also serve to provide a dart making cut when the pieces are sewn together. Edges 74L and 74P connect the edges 74M and 74N to the sides 74*h* and 74*k* respectively. In the central portion the edges 70*h* and 70*k* connect the ends of the bases 70*g* and 70*j*.

Regarding the drawings and particularly FIGS. 5–12, it must be said that the relationships between the sides including the angular relation thereof is relative. Thus for example, while in practice the sides 74M and 74K may be cut so that they are parallel this not necessary because the material is cut about an inch oversize along most edges to facilitate seam forming. Any inaccuracies in cutting may be corrected in sewing.

Figure 10:
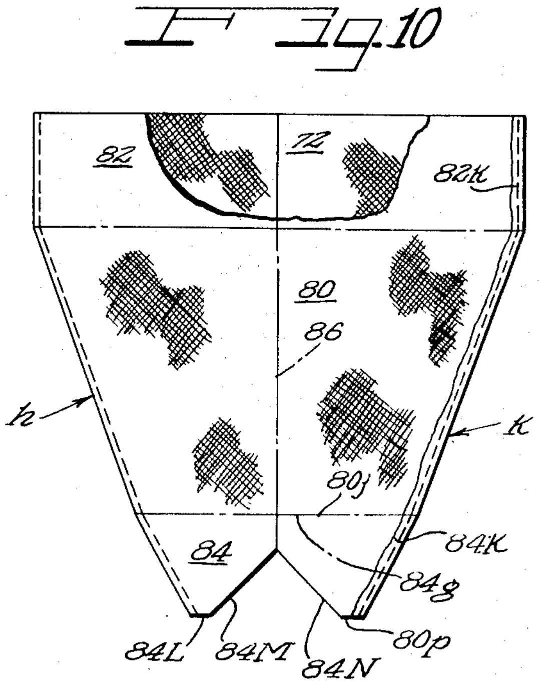
FIG. 10 is a full side view illustrating two of the pieces of material shown in FIG. 9 superimposed on one another and joined along two opposite edges.

FIG. 10 shows a second piece 80, 82, 84 superimposed on the first piece 70, 72, 74. The second piece is substantially identical to the first piece and bears corresponding designations, the description of which will not be repeated. With the pieces atop one another the edges designated with the suffix *h* and K are joined by stitching or other equivalent means. As shown, the material is first turned over along the edges *h* and K are then sewn to provide a sturdy joint.

With the first and second pieces sewn along their opposite edges the pieces are pulled away from each other along lines 76 and 86 to a position where the edges *h* and K are approximately abutting. At this point the edges designated by the suffixes M and N are brought into side by side relation and a joint effect therebetween. This latter operation also joins the ends of the seams *h* and K thereby completing the formation of the bag. Due to slight variations in joining it may be necessary to add an additional stitch in the area of the center of the bottom although this is not to be expected.

Figures 11, 12:
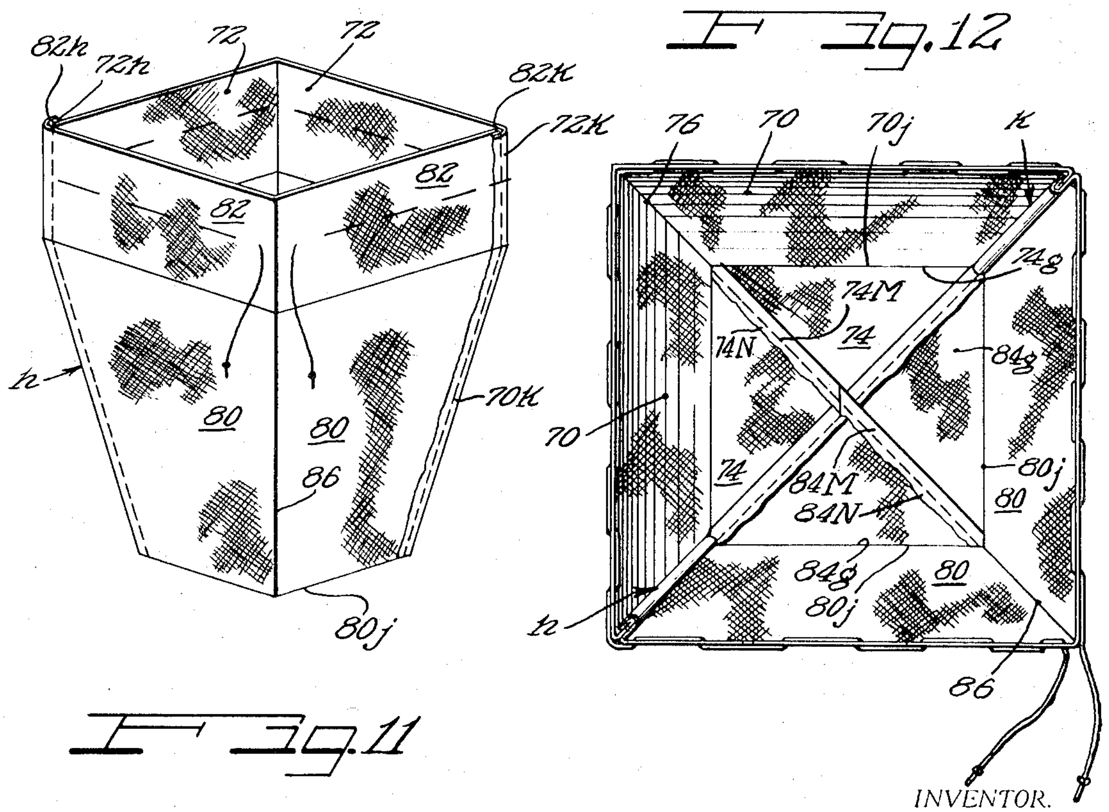
FIG. 11 is a perspective view of the piece of material of FIG. 10 having the bottom flaps joined.
FIG. 12 is a view looking into the open end of a completed and fully opened bag of the second embodiment of the present invention.

It may thus be seen that the bag of this embodiment may be formed in two quick and convenient steps while providing a strong and durable bag. FIG. 12 shows a completed bag turned inside out and viewed looking into the open end.

The advantages of the two-piece embodiment over the previously described four-piece embodiment are a reduction in the seams needed and a consequent reduction in cutting and joining labor. The importance of having less seams is that not only does it reduce the cost of making bags, but also it provides a stronger bag.

We have found the above noted bag constructions and methods of making the bags to provide a novel, inexpensive and convenient means for encasing the balls of plants or trees so as to preserve the predetermined configuration of the ball and thereby produce the advantages set out above.

It will be understood that variations and modifications may be effected without departing from the spirit and scope of the novel concepts of this invention.

We claim:

1. A bag for the soil and roots accompanying a living tree or plant removed from the earth, said bag being fabricated to the predetermined contour of said soil and roots and having the predominant configuration of the frustrum of an inverted four-sided pyramid, said bag being constructed of four pieces of material secured together, each of said pieces comprising a central portion in the shape of a regular trapezoid, said regular trapezoid having a long base, a short base and a pair of sides interconnecting the ends of said base, a rectangular flap associated with each of said bases, said flaps having one side in common with each of said bases and extending therefrom, said sides of said central portion being connected in series so that a strong bag is formed, said flap associated with said short base having a V-shaped notch centrally located therein on the side opposite said common side prior to forming the closed bottom, said flap being folded and sewn together with the flaps of the other adjacent pieces to form the bottom of said bag, said flap associated with said long base being adapted to accommodate a drawstring.

2. A bag according to claim 1, wherein the material of said bag is burlap and the drawstring is made of polypropylene.

3. A bag according to claim 2, wherein the material is cut along the woof or warp, and the connections between the pieces forming the bag are of a double seam type and occur on the inside of a completed bag.

4. A method of making a contour bag comprising cutting four pieces of material, each of said pieces comprising a central portion in the shape of a regular trapezoid, said regular trapezoid having a long base, a short base and a pair of sides interconnecting the ends of said bases, a rectangular flap associated with each of said bases, said flap associated with said short base having a centrally located V-shaped notch in its free edge, overlaying a pair of said pieces in coextensive relationship, joining one edge of each of said pieces to the other, said joined edge including the sides of said trapezoid and an adjacent edge of each of said flaps, each of said pairs of joined pieces having free edges opposite the joined edges, joining the free edges of the pair of the edge joined pieces so as to form a generally tubular structure, joining the edges of each of said V-shaped notches of each of said pieces so that a rectangular bottom is formed in the bag, all of said seams being double sewn and placed inwardly of said bag, and providing a drawstring in the upper flap.

References Cited

UNITED STATES PATENTS

| | | | |
|---|---|---|---|
| 1,464,534 | 8/1923 | Lovett | 47—37 |
| 1,994,553 | 3/1935 | Wolcott | 47—37 |
| 2,796,700 | 6/1957 | Katz | 47—37 |
| 3,080,680 | 3/1963 | Reynolds et al. | 47—37 |

ROBERT E. BAGWILL, Primary Examiner

U.S. Cl. X.R.

93—35; 150—1